United States Patent [19]

Laue

[11] Patent Number: 4,697,275
[45] Date of Patent: Sep. 29, 1987

[54] RECEIVING CIRCUIT FOR SIGNAL TRANSMISSION SYSTEMS

[75] Inventor: Hans-Bodo Laue, Altenbeken, Fed. Rep. of Germany

[73] Assignee: Nixdorf Computer AG, Fed. Rep. of Germany

[21] Appl. No.: 765,285

[22] Filed: Aug. 13, 1985

[30] Foreign Application Priority Data

Aug. 17, 1984 [DE] Fed. Rep. of Germany ....... 3430339

[51] Int. Cl.⁴ .............................. H04B 9/00
[52] U.S. Cl. ......................... 375/4; 375/76; 455/601; 455/608
[58] Field of Search ............. 375/4, 25, 76; 455/600, 455/601, 608, 606, 607, 613; 370/35, 75, 97

[56] References Cited

U.S. PATENT DOCUMENTS

| | | | |
|---|---|---|---|
| 3,777,268 | 12/1973 | Cleobury et al. | 375/76 |
| 4,001,578 | 1/1977 | Cook et al. | 455/608 |
| 4,337,457 | 6/1982 | Tache | 455/608 |
| 4,402,084 | 8/1983 | Jungmeister | 375/4 |
| 4,475,210 | 10/1984 | Couch | 375/76 |
| 4,481,676 | 11/1984 | Eumurian et al. | 455/608 |
| 4,553,249 | 11/1985 | Goerne et al. | 455/608 |
| 4,561,118 | 12/1985 | Thinschmidt et al. | 455/608 |

Primary Examiner—Robert L. Griffin
Assistant Examiner—Stephen Chin
Attorney, Agent, or Firm—Cullen, Sloman, Cantor, Grauer, Scott & Rutherford

[57] ABSTRACT

A receiving level control signal is generated line side, and the data signal is reproduced line side of a receiving circuit for signal transmission systems to regenerate a data signal and to generate a receiving level control signal from a received bipolar input signal, in which line and operating side are electrically isolated.

7 Claims, 1 Drawing Figure

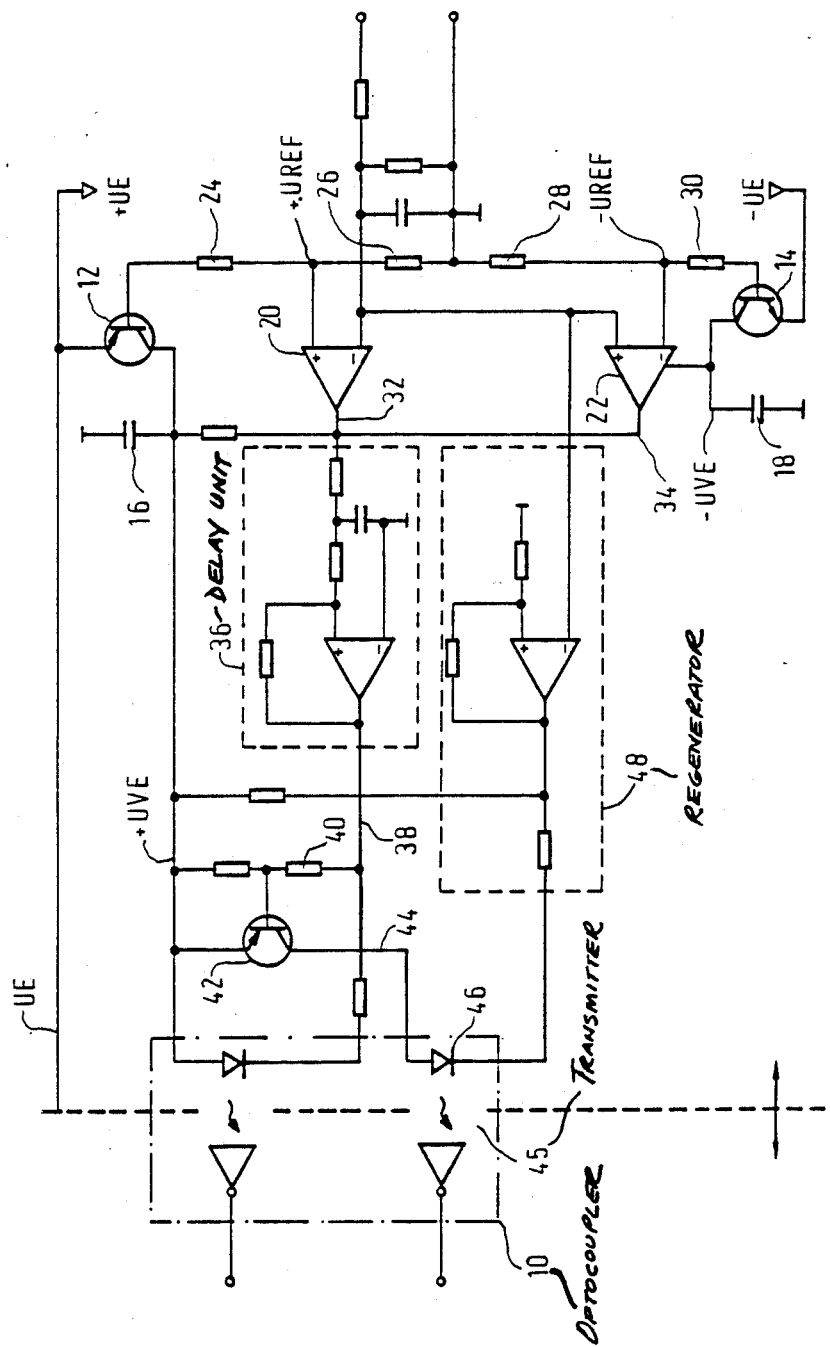

RECEIVING CIRCUIT FOR SIGNAL TRANSMISSION SYSTEMS

TECHNICAL FIELD

The invention concerns a receiving circuit for signal transmission systems to regenerate a data signal and to generate a receiving level control signal from a received bipolar input signal with an optocoupler configuration electrically isolating the line and operating side, and with two comparators to specify a receiving threshold for the bipolar input signal.

BACKGROUND ART

FIG. 10.3.2-3 of Hewlett-Packard publication "Optoelectronics, Fiberoptics Application Manual", 1981, discloses a receiving circuit in which an output signal that is both differential and symmetrically grounded is tapped via two comparators which specify a receiving threshold. Valid signals which exceed the prescribed receiving threshold are electrically isolated from the line side by means of an optocoupler configuration and are transmitted to the operating side of the receiving circuit where they are regenerated by means of a bi-stable, flip-flop circuit. The receiving level recording signal is also generated only on the operating side from the symmetrically grounded, differentially transmitted output signal. This occurs because the two optocouplers' output signals of the optocoupler configuration, via which the symmetrically grounded output signal is transmitted in case of sufficient receiving level, are logically linked via a NAND gate so that the receiving level control signal is present on its output.

The disadvantage of such a receiving circuit where the receiving level control signal is generated only on the operating side, is that the received data does not always appear only after exceeding a receiving threshold. This is due to distortion of the received input signal which is caused along the transmission route and under some conditions, can lead to difficulties in the evaluation of the received data.

Consequently, it is an object of this invention to provide a receiving circuit which allows error free regeneration of received data, even where the received input signal possesses distortions.

SUMMARY OF THE INVENTION

According to the present invention, the receiving level recording signal and the data signal are regenerated by the line side of a receiving circuit for a signal transmission system.

By using this device, the usual disadvantage of the receiving circuit previously described, can be avoided. Thus, stable, received data finally appear on the operating side only after exceeding the receiving threshold— even in the case of a bipolar input signal which is relatively severely distorted. Consequently, the light emitting diodes of the optocoupler configuration are switched on only when an input signal with a valid receiving level is present on the receiver. This contributes to a longer life span for the optocoupler configuration and reduces current consumption of the line side circuit when there is an inefficient receiving level.

In a preferred form of the invention, the receiving level control signal for each polarity of the input signal is generated by one of two comparators. An important feature of the receiving circuit design is the provision of a receiving level control signal which is generated for each polarity of the input signal by one of the two comparators.

As a further refinement of the invention, the receiving level control signal is delayed by an RD-element with a delay-switched Schmitt-trigger. Thus, the receiving level control signal is produced only when a valid receiving level of the bipolar input signal in excess of the positive negative receiving threshold is present. It is immaterial at what amplitude the input signal exceeds the relevant receiving threshold. Thus, temporarily high voltage disturbances present during the abovementioned minimal time, are suppressed independent of their amplitude. This assures that a receiving level control signal is not generated falsely by peak voltage disturbances. The times when the receiving level control signal is switched on and off are independent of the receiving level and can be determined variably for valid receiving levels which exceed the receiving threshold.

In the preferred form of the invention, the receiving level control signal is the driving signal for a switching transistor which is located in the primary circuit of the data signal's transmitting component of the optocoupler configuration. This has the advantage that the optocoupler light emitting diode carrying the data signal is closed by the receiving level control signal (produced on the line side), when no valid receiving level is present on receiving circuit's input. This guarantees both a long optocoupler configuration life span and a defined output signal of the data transmitting component of the optocoupler configuration in the event of an insufficient receiving level.

To regenerate the data signal, the bipolar input signal is fed through a second Schmitt-trigger. The hysteresis of the Schmitt-trigger can be adjusted in such a manner that the Schmitt-trigger prepares the altered input signal so that, considering the transition distortion caused by the optocoupler configuration, the output signal of the data signal's transmitting component of the optocoupler configuration exhibits the least possible distortion over the entire receiving level spectrum of the receiver. Thus, reliable reception of incoming data is guaranteed, particularly in high-speed transmissions.

Hard wired comparators are preferably employed as Schmitt-triggers, since these, along with the comparators which generate the receiving level control signal, can be placed in a single housing to save space and cost.

BRIEF DESCRIPTION OF THE DRAWING

The single FIGURE of drawing depicts a detailed schematic diagram of a receiving circuit for signal transmission systems.

DESCRIPTION OF THE PREFERRED EMBODIMENT

The receiving circuit consists of an operating side component (to the left of the vertical broken line in the FIGURE) and a line side component (to the right of the vertical broken line in the figure). The operating side component of the receiving circuit is thereby electrically isolated from the line side component by means of an optocoupler configuration 10.

The line side component of the receiving circuit is supplied with voltage via rectifier transistors 12 and 14 in a grounded base circuit. An incident line side alternating voltage UE is rectified through transistors 12 and 14 along with filter capacitors 16 and 18 to produce a positive and a negative receiver supply voltage +UVE, −UVE respectively.

The receiver level control signal is produced by a first comparator 20 in the case of an input signal having positive polarity and by a second comparator 22 in the case of an input signal having negative polarity. The positive reference voltage +UREF on voltage comparator 20 which is used to specify a receiving threshold for a positive input signal, is produced by tapping base resistors 24 and 26 of rectifier transistor 12. Analogously, the negative reference voltage −UREF on voltage comparator 22 which is used to specify a receiving threshold for a negative input signal, is produced by tapping base resistors 28 and 30 of rectifier transistor 14.

It is advantageous to use the above-mentioned technique to produce the reference voltages because the input resistance of the receiving circuit is increased in the case of high levels of interruption in receiver supply voltages −UVE, −UVE and because two additional resistors can be eliminated compared to customary techniques for producing the reference voltage. Outputs 32 and 34 of both comparators 20 and 22 are connected to the input of a first Schmitt-trigger 36 which delays the receiver level control signal. The receiver level control signal, which is transmitted to the operating side via optocoupler configuration 10, is then present on output 38 of the Schmitt-trigger 36. Output 38 of Schmitt-trigger 36 is further connected to the base of switching transistor 42 via resistor 40. This transistor is located in primary circuit 44 of the data signal transmitting component 45 of optocoupler configuration 10, and also powers optocoupler light emitting diode 46 when the receiving level control signal activates switching transistor 42. The received input data is regenerated by means of a second Schmitt-trigger 48 and is transmitted to the operating side via data signal transmitting component 45 of optocoupler configuration 10. The latter is possible only when the receiving level control signal on output 38 of the first Schmitt-trigger 36 has activated switching transistor 42, so that optocoupler light emitting diode 46 is powered.

What is claimed is:

1. A receiving circuit for an electrical signal transmission system employed to regenerate a level control electrical signal from an input bipolar electrical signal, comprising:

- an operating side for delivering the regenerated electrical data signal and a receiving level electrical control signal;
- a line side having an input for receiving said bipolar signal;
- an optocoupler device (10) for electrically isolating said line side from said operating side and for transferring said data signal and said level control signal from said line side to said operating side;
- a pair of comparators (20,22) on said line side for respectively establishing positive and negative receiving thresholds for said bipolar input signal, including a pair of outputs (32,34) for generating said level control signal;
- regenerating means (48) on said line side for regenerating said data signal, said regenerating means including an input for receiving said received data signal and an output for outputting the regenerated data signal;
- delay means (36) on said line side and coupled with the outputs (32,34) of said comparators (20,22) for delaying the delivery of said level control signal from said line side to said operating side for a preselected length of time; and
- switch means (42) on said line side and responsive to said delay means for selectively connecting the output of said regenerating means (48) with said optocoupler device (10), whereby the transfer of said regenerated data signal from said line side to said operating side is controlled by said level control signal.

2. The receiving circuit of claim 1, wherein said delay means (36) includes a Schmitt trigger.

3. The receiving circuit of claim 2, wherein said Schmitt trigger includes a comparator.

4. The receiving circuit of claim 1, wherein said switch means (42) includes a transistor having a base controlled by said level control signal, said transistor being coupled in a circuit containing said delay means and said optocoupler device (10).

5. The receiving circuit of claim 1, wherein said regenerating means includes a Schmitt trigger having an input for receiving said bipolar signal.

6. The receiving circuit of claim 5, wherein said Schmitt trigger includes a comparator.

7. the receiving circuit of claim 1, wherein said delay means (36) includes an output (38) connected with said switch means (42) and said optocoupler device (10) for simultaneously delivering said level control signal to said switch means (42) and said optocoupler device (10).

* * * * *